United States Patent
Klüssendorff et al.

(10) Patent No.: US 9,468,352 B2
(45) Date of Patent: Oct. 18, 2016

(54) CLEANING ROBOT

(71) Applicant: Hako GmbH, Bad Oldesloe (DE)

(72) Inventors: Jan Helge Klüssendorff, Lübeck (DE); Dariush Forouher, Lübeck (DE); Rainer Bavendiek, Wentorf (DE); Axel Zimny, Großhansdorf (DE)

(73) Assignee: HAKO GMBH (DE)

( * ) Notice: Subject to any disclaimer, the term of this patent is extended or adjusted under 35 U.S.C. 154(b) by 198 days.

(21) Appl. No.: 14/177,268

(22) Filed: Feb. 11, 2014

(65) Prior Publication Data

US 2014/0223675 A1    Aug. 14, 2014

(30) Foreign Application Priority Data

Feb. 12, 2013   (EP) .................... 13154994

(51) Int. Cl.
*G05D 1/00* (2006.01)
*A47L 11/40* (2006.01)
*A47L 11/293* (2006.01)
*A47L 11/30* (2006.01)
*G05D 1/02* (2006.01)

(52) U.S. Cl.
CPC .......... *A47L 11/4011* (2013.01); *A47L 11/293* (2013.01); *A47L 11/305* (2013.01); *A47L 11/4061* (2013.01); *G05D 1/027* (2013.01); *G05D 1/0242* (2013.01); *G05D 1/0246* (2013.01); *G05D 1/0272* (2013.01); *A47L 2201/00* (2013.01); *A47L 2201/04* (2013.01); *G05D 2201/0203* (2013.01)

(58) Field of Classification Search
CPC ............. A47L 11/4011; A47L 11/293; A47L 11/305; A47L 11/4061; A47L 2201/00; A47L 2201/04; G05D 1/0242; G05D 1/0246; G05D 1/0272; G05D 2201/0203
USPC ............................................. 701/1
See application file for complete search history.

(56) References Cited

U.S. PATENT DOCUMENTS

| 6,667,592 B2 | 12/2003 | Jacobs et al. |
| 8,150,650 B2 | 4/2012 | Goncalves et al. |
| 8,382,906 B2 * | 2/2013 | Konandreas ....... A22C 17/0013 134/21 |

(Continued)

FOREIGN PATENT DOCUMENTS

| DE | 19614916 A1 | 11/1997 |
| DE | 102007015552 B3 | 8/2008 |
| DE | 102011004319 A1 | 8/2012 |

*Primary Examiner* — Hussein A. Elchanti
(74) *Attorney, Agent, or Firm* — Harness, Dickey & Pierce, P.L.C.

(57) ABSTRACT

A floor-cleaning robot having a chassis for moving the floor-cleaning robot in a direction of travel over a surface to be cleaned, a cleaning implement, a control unit and first and second measuring devices for three-dimensional distance measurement. Each of the first and second measuring devices is configured to sense distance between the measuring device and a plurality of surface elements within a respective solid angle that is spanned from the measuring device. The first and second measuring devices are aligned in such a manner that the direction of travel runs through the first solid angle. The second solid angle is offset in relation to the first solid angle. The control unit is designed to generate and/or update a representation of the surface to be cleaned, on the basis of the distances from surface elements sensed by first and second measuring devices.

15 Claims, 2 Drawing Sheets

(56) References Cited

U.S. PATENT DOCUMENTS

| | | | | |
|---|---|---|---|---|
| 8,428,778 B2* | 4/2013 | Landry | ............... | A47L 11/4011 318/568.12 |
| 8,918,209 B2* | 12/2014 | Rosenstein | ............ | B25J 11/009 700/245 |
| 8,958,911 B2* | 2/2015 | Wong | ............................ | 700/258 |
| 9,038,233 B2* | 5/2015 | Jones | ............................. | 15/319 |
| 2005/0000543 A1* | 1/2005 | Taylor | .................. | G05D 1/0219 134/18 |
| 2005/0218852 A1* | 10/2005 | Landry | ................. | A47L 9/2805 318/580 |
| 2006/0020369 A1* | 1/2006 | Taylor | .................... | A47L 9/009 700/245 |
| 2010/0037418 A1* | 2/2010 | Hussey | .................... | A47L 5/30 15/319 |

\* cited by examiner

CLEANING ROBOT

CROSS-REFERENCE TO RELATED APPLICATIONS

This application claims priority to European Patent Application No. 13154994.1 filed Feb. 12, 2013, the disclosure of which in incorporated by reference as if fully set forth in detail herein.

FIELD

The present disclosure relates to a cleaning robot.

BACKGROUND

This section provides background information related to the present disclosure which is not necessarily prior art.

The present disclosure relates to a floor-cleaning robot, comprising a housing, having a chassis with a drive for moving the floor-cleaning robot in a direction of travel over a surface to be cleaned, a cleaning means, which is adapted to engage with the surface to be cleaned, a control unit, and a first measuring device for three-dimensional distance measurement, which is adapted to sense the distance of the first measuring device from a plurality of surface elements within a first solid angle that is spanned from the first measuring device, wherein the control unit is adapted to guide the floor-cleaning robot over the surface to be cleaned, by means of a representation of the surface to be cleaned, and to clean the surface to be cleaned.

A floor-cleaning robot—also referred to in brief in the following as a cleaning robot or robot—is a floor-cleaning machine that has been adapted to move autonomously over a surface to be cleaned, and to clean the latter. Unlike conventional floor-cleaning machines, the robot does not depend on being actively guided by an operator over the surface to be cleaned. The robot itself determines the route along which it travels over the surface to be cleaned, and how it cleans the latter. For this, the robot obviously requires a plurality of sensors, by means of which it can sense its environment and, more precisely, the distances in relation to its environment.

A cleaning robot is known from DE 10 2011 004 319 A1 that has a chassis with a drive for moving the cleaning robot over a surface to be cleaned. The cleaning robot additionally has a cleaning means, and has a plurality of distance measuring sensors. These are both infrared and ultrasonic sensors, by means of which the point-specific distance in relation to a surface element, such as a wall or a fitment, is determined.

As used herein, the term "surface element" will be understood to mean, firstly, a portion of the surface to be cleaned, the distance from which is determined. However, it may also be a portion of a surface of an object located on the surface to be cleaned or, for example, a portion of a surface of a wall that delimits the surface to be cleaned.

For the purpose of distance measurement, the cleaning robot known from DE 10 2011 004 319 A1 uses only such distance measuring devices that, in each case, can determine the distance in relation to only one surface element located within the solid angle in which the distance measuring device is able to determine a distance. Disadvantageously, therefore, there is a need for a plurality of distance measuring devices, which can be evaluated only with large outlay in order to generate travel instructions for the cleaning robot therefrom. Moreover, the environment of the cleaning robot is sensed only with a very rough matrix, since the number of sensors is limited. Exact guidance of the robot is therefore possible only to a limited extent.

A further floor-cleaning robot is known from U.S. Pat. No. 6,667,592 B2. The cleaning robot has a plurality of distance measuring devices, which are formed, for example, as laser sensors or as ultrasonic sensors. Unlike ultrasonic sensors, which can sense the environment around the cleaning robot only in a point-specific manner, laser sensors allow sensing of the distances in relation to the environment in a plane that, for example, runs parallelwise or at an angle in relation to the surface to be cleaned. In other words, laser sensors allow sensing of distances in one dimension. The laser sensor, however, does not sense obstacles in the environment that are located outside of the sensed plane.

Finally, known from U.S. Pat. No. 8,150,650 B2 is a cleaning robot having an optical sensor by means of which images of the environment of the cleaning robot are recorded. The information that can be obtained from the images is compared with information from coupling sensors, in order to discover the position of so-called landmarks. In this way, the cleaning robot can move over a known surface to be cleaned. The use of optical sensors that do not have their own active illumination is disadvantageous, however, since the spaces in which the cleaning robot moves need to be adequately illuminated. However, active illumination in the visible spectral range can be disadvantageous, since this may cause persons to be dazzled.

SUMMARY

This section provides a general summary of the disclosure, and is not a comprehensive disclosure of its full scope or all of its features.

It is therefore the object of the present disclosure to provide a floor-cleaning robot that avoids at least some of the disadvantages known from the prior art. For example, the floor-cleaning robot can be capable of moving over an unknown surface to be cleaned and need not be dependent on adequate illumination of the surface to be cleaned.

This object can be achieved, for example, by a floor-cleaning robot having a second measuring device for three-dimensional distance measurement, which is adapted to sense the distance of the second measuring device from a plurality of surface elements within a second solid angle that is spanned from the second measuring device, wherein the first measuring device and the second measuring device are aligned in such a manner that the direction of travel runs through the first solid angle, and the second solid angle is offset in relation to the first solid angle, and wherein the control unit is designed to generate and/or update the representation of the surface to be cleaned on the basis of the distances from surface elements sensed by means of the measuring devices.

A floor-cleaning robot constructed in accordance with the teachings of the present disclosure can include a housing, in which a plurality of components may be disposed. These include various sensor means, motors, dirt containers, fresh-water tank, dirty-water tank, and other necessary elements that are known from prior art floor-cleaning machines. Disposed beneath the housing there is a chassis, which comprises a drive for moving the floor-cleaning robot along a direction of travel over a surface to be cleaned. In the following, the direction of travel of the robot is understood to mean the direction parallel to the tangent of the movement path of the robot on the surface to be cleaned, in the direction of forward travel of the robot.

In the case of the floor-cleaning robot constructed in accordance with the teachings of the present disclosure, the drive may not only effect a forward or reverse movement, but may also be used to determine the direction in which the robot moves. In this case, the change in direction may be effected by wheels that are rotatable about an axis that runs perpendicularly in relation to the surface to be cleaned, or by the driving of a plurality of wheels at differing speeds or in differing directions of rotation.

The cleaning robot constructed in accordance with the teachings of the present disclosure can additionally comprise, preferably beneath the housing, a cleaning means that is adapted to engage with the surface to be cleaned. This cleaning means may be, for example, a dry-type cleaning means, such as a sweeping roller, or it may also be a wet-type cleaning means. Such cleaning means are sufficiently known from the state of the art.

Additionally, a cleaning robot constructed in accordance with the teachings of the present disclosure can include a control unit, which can be adapted to assume control of the floor-cleaning robot. The control unit may, for example, effect activation and deactivation of the cleaning means, but is designed, in particular, to guide the floor-cleaning robot over the surface to be cleaned, with the result that the latter can be cleaned. For this, the control unit uses a representation of the surface to be cleaned. This representation may be, for example, a map, in which are entered the dimensions of the surface to be cleaned, as well as the position and dimensions of fitments and obstacles contained therein. This representation may be stored, for example, in a memory in the control unit. Any file format may be used for storage here. The term control unit is to be understood in a broad sense. It is not limited to a single, spatially coherent arrangement of electronic elements, but comprises all, and particularly also spatially distributed, components of the floor-cleaning robot that assume at least some of the control of parts of the floor-cleaning robot.

Additionally provided are first and second measuring devices for three-dimensional distance measurement, which are adapted to simultaneously sense the distance of the measuring devices from a plurality of surface elements at a first and a second solid angle. A three-dimensional distance measurement is the measurement of the distance from a plurality of surface elements within a solid angle, wherein more than two surface elements, whose distances in relation to the measuring device can be measured, directly adjoin at least one surface element in the solid angle. Such a measuring device can therefore sense not only a linear arrangement of surface elements, but also a planar arrangement. Furthermore, the first and second measuring devices differ from e. g. ultrasonic sensors in that the latter, within the solid angle viewed by them, merely average over a single surface element corresponding to the size of the solid angle, and do not simultaneously sense the respective distance in relation to a plurality of surface elements.

The first and the second measuring devices for three-dimensional distance measurement can each have a light source, a camera and an evaluation means. The light source can emit light having a wavelength in a range of between 780 nm and 3000 nm, and preferably of between 780 and 1200 nm. The light emitted by the light source illuminates, with a matrix, surface elements that are disposed within the respective solid angle. The camera records light that has been emitted by the light source and that is reflected by the surface elements within the solid angle. The evaluation means is adapted to determine, from the matrix reflected by the surface elements, the distance of the floor-cleaning machine in relation to the surface elements.

Configuration of the first and second measuring devices for three-dimensional distance measurement in this manner is advantageous, since light emitted in a wavelength range that is not visible for the human eye is used for distance measurement. Consequently, persons present in the region of the cleaning robot are not dazzled or disturbed by the light source. However, it is also conceivable to use other measuring devices for three-dimensional distance measurement, for example based on stereoscopic methods or "time-of-flight" measurements, provided that these measuring devices are suitable for sensing the distance of the measuring device in relation to a plurality of surface elements at a solid angle, or for performing a three-dimensional distance measurement.

The first and the second solid angle, or the first and the second measuring device for three-dimensional distance measurement, are aligned in such a manner that the direction of travel runs through the first solid angle, and the second solid angle is offset in relation to the first solid angle. The alignment of the first measuring device ensures that the region around the direction of travel is sensed, i.e. the region in which there is an immediate danger of a collision with an obstacle. The second measuring device senses the region at a greater distance from the direction of travel, with the result that here further information concerning the dimensions of the surface to be cleaned can be established.

The control unit can employ the data produced by the first and the second measuring devices in order to update and/or generate the representation of the surface to be cleaned. If the cleaning robot travels over an unknown surface to be cleaned, the distances in relation to surface elements, recorded by the measuring devices, are used to generate for the first time a representation of the surface to be cleaned, and the control unit can guide the cleaning robot over the surface to be cleaned on the basis of this representation. If the cleaning robot travels over an already known surface, the data are used, on the one hand, to enable the control system to determine the position of the cleaning robot within the existing representation and, on the other hand, to verify and, if necessary, to update the representation of the surface to be cleaned if, for example, objects on the surface have moved. The control unit can thus at any time access a current representation of the surface to be cleaned, in a region located within the first and/or the second solid angle.

The use of two measuring devices for three-dimensional distance measurement is advantageous, since, in this way, it is possible to sense a large combined solid angle, in which the distances in relation to a plurality of surface elements can be measured and their position can be determined. The representation of the surface to be cleaned is thus updated continuously in the combined solid angle. In this case, the distances sensed by the measuring devices serve not only to detect and bypass obstacles, but also for orientation on a previously compiled representation of the space.

The monitoring of a large (combined) solid angle makes it possible, in particular, for the cleaning robot to clean particularly close to walls, and also in corners. In floor-cleaning robots known from the prior art, a minimum distance with respect to walls and other obstacles must be maintained in order that the measuring devices for distance measurement can sense sufficient information to enable them to orient themselves in the space and to sense with sufficient precision the surface to be cleaned. Owing to the enlargement of the solid angle that is sensed (i.e., the provision of the relatively large (combined) solid angle), a floor-cleaning robot constructed in accordance with the teachings of the present disclosure can, for example, fall short of the minimum distance for sensing of obstacles of the first measuring device for distance measurement, even in the direction of travel, since the second measuring device for distance measurement continues to supply data to an extent sufficient for updating the map and for orientation on the surface to be cleaned.

In another form, a cleaning robot constructed in accordance with the teachings of the present disclosure can also be operated manually, in addition to the automatic, or autonomous, cleaning of surfaces. In other words, the cleaning robot can be put into a mode in which control is assumed by an operator. For this, the operator can either walk behind the floor-cleaning robot, as in a hand-guided floor-cleaning machine known from the prior art, or sit on the floor-cleaning robot, as is likewise known from ride-on floor-cleaning machines from the prior art.

The cleaning means can project beyond the housing, towards a first side, perpendicularly in relation to the direction of travel and parallelwise in relation to the surface to be cleaned, or can terminate flush with this side. The second measuring device for three-dimensional distance measurement is aligned in such a manner that the second solid angle is located on the side of the floor-cleaning robot that faces away from the first side, is disposed outside of the travel path of the floor cleaning robot, and the travel path does not intersect the second solid angle.

The cleaning means of the cleaning robot can be disposed in such a manner such that it projects out of the housing on a first side, or terminates flush with the housing at the side. This arrangement is already advantageous per se, since it makes it possible to travel particularly closely at the side past walls, edges and other objects, and to clean these without the risk of the housing of the floor-cleaning robot becoming damaged. In order that the greatest possible proportion of the surface to be cleaned is also actually cleaned, the floor-cleaning robot is preferably moved past walls and other objects at the least possible distance from its first side.

The second measuring device for three-dimensional distance measurement can be aligned such that the second solid angle is located on the side of the floor-cleaning robot that faces away from the first side and, moreover, no longer senses the travel path. The travel way or travel path of the floor-cleaning robot is to be understood here to mean the region of the surface to be cleaned that is defined by the projection of the housing onto the surface to be cleaned as the robot moves along its current direction of travel. Consequently, in the case of straight-line movement along the direction of travel, the housing of the floor-cleaning robot would collide with objects disposed on or above the travel path. The first measuring device can be aligned such that it senses surface elements in the direction of travel and in the region of the travel path of the floor-cleaning robot.

Furthermore, the second measuring device can be aligned such that, by means of this measuring device, it is possible to sense distances in relation to surface elements disposed on the side of the travel way, or of the floor-cleaning robot, that faces away from the first side. The second measuring device therefore does not sense distances in relation to surface elements passed by the floor-cleaning robot on its first side, if it continues travel without changing direction, but on the opposite side. Distances in relation to surface elements on the first side of the travel way, or of the floor-cleaning robot, can be sensed, for example, by the first measuring device or by further, correspondingly aligned measuring devices.

Configuration of the second measuring device in this manner is particularly advantageous, since—as already outlined above—the first side is used primarily for travelling as closely as possible past walls and other objects, in order to enable comprehensive cleaning. The floor-cleaning robot will therefore change its direction of travel primarily to a direction facing away from the first side. This region is sensed by means of the second measuring device, with the result that the control unit is always able to evaluate fully the possibility of turning. This function cannot be assumed by the first measuring device alone, since the solid angle that can be sensed by the first measuring device is too small.

In addition to the sensing of obstacles, the first and second measuring devices can also serve to orient themselves and to locate the floor-cleaning robot in the space. The re-recognition of obstacles allows the control unit to determine the position of the cleaning robot within the map, and also to determine its direction of travel, and thus its orientation. In many standard measuring devices for three-dimensional distance measurement, however, a minimum distance must be maintained, in order that the distance can be measured. If the cleaning robot travels directly past a wall, the minimum distance is frequently not maintained, and the measuring device does not supply any data whatsoever that can be used for orienting and locating in the space. Consequently, the alignment of the second measuring device for three-dimensional distance measurement, away from the first side, increases the probability that additional objects can be sensed, and of improved location and orientation in the space.

In yet another form, a floor-cleaning robot constructed in accordance with the teachings of the present disclosure can have a third measuring device for three-dimensional distance measurement, which can be adapted to simultaneously determine the distance of the measuring device from a plurality of surface elements, and which is aligned in such a manner that only distances in relation to surface elements disposed on the first side of the floor-cleaning robot, and preferably outside of the travel path, can be sensed. This allows the compilation of a particularly detailed representation of the surface to be cleaned, and particularly exact sensing of the distance in relation to surface elements on the first side. A third measuring device is particularly advantageous in embodiments of a floor-cleaning robot whose cleaning means also projects beyond the housing to the side that faces away from the first side. Such cleaning robots can travel equally close to obstacles with both sides in order to clean the surface to be cleaned. The third measuring device thus provides supplementary recordings of the surface to be cleaned if the cleaning robot, with its side that faces away from the first side, falls short of the minimum distance of the second measuring device in relation to obstacles, and it thus enables the surface to be cleaned thoroughly, without the need to accept reductions in the quality of the representation of the surface to be cleaned. Moreover, a floor-cleaning robot equipped in such a manner has a high degree of flexibility in the choice of path over the surface to be cleaned.

In still another form, a floor-cleaning robot constructed in accordance with the teachings of the present disclosure can have a fourth measuring device for three-dimensional distance measurement, which can be adapted to simultaneously determine the distance of the measuring device from a plurality of surface elements, and which is aligned in such a manner that it senses surface elements that are disposed in a direction opposite to the direction of travel, or behind the floor-cleaning robot. This arrangement is particularly advantageous if the floor-cleaning robot is to travel backwards, at least over short distances. The fourth measuring device would additionally increase the accuracy of the location of the floor-cleaning robot, and improve the sensing of obstacles on the surface to be cleaned.

In a further form, the light source of the first measuring device for three-dimensional distance measurement and the light source of the second measuring device for three-dimensional distance measurement can be pulsed. The light source of the first measuring device can be correlated with the light source of the second measuring device in such a manner that the light source of the first measuring device does not emit any light when the light source of the second measuring device emits light. In this way, it can be ensured that, in each case, only one light source emits light at a time. This prevents the matrices of the light sources from being superimposed on each other, and erroneous distance measurements from occurring.

In yet another form, the first and the second solid angle can be horizontally adjacent to each other, i.e. parallelwise in relation to the plane of the surface to be cleaned, and do not overlap. This is advantageous, since the distances in relation to a plurality of surface elements can be monitored in a particularly large combined solid angle, and also, in the case of light sources that are not pulsed and correlated, there is no risk of superimposition of the matrices.

The floor-cleaning robot can have a cleaning means that is disposed at least partially in the direction of travel in front of the chassis. Optionally, the cleaning means can have a cover, which can project beyond the housing, parallelwise in relation to a surface to be cleaned, in the direction of travel and/or perpendicularly in relation to the direction of travel.

In one form, the cleaning means can have one or more rotating cleaning brushes beneath the cover.

In still another form, a cleaning robot constructed in accordance with the teachings of the present disclosure can have an under-run protection device, which can be provided on the cover of the cleaning means. The under-run protection device can have a distance measuring device, such as an ultrasonic sensor, which can be aligned substantially perpendicularly in relation to the surface to be cleaned and by means of which the distance of the under-run protection device in relation to a surface element, located in the direction of travel in front of the housing of the floor-cleaning robot, can be sensed, wherein the under-run protection device is adapted to transmit a stop signal to the control unit.

In another form, the under-run protection device, which can be attached to the cover of the cleaning means, is an independently inventive concept, which can also be employed on other floor-cleaning robots, or also on conventional floor-cleaning machines that have a chassis and a cleaning means attached thereto. The under-run protection is can be formed by an upwardly directed ultrasonic sensor or an infrared sensor. This may be disposed on the cover of the brush head of the cleaning robot. In alternative embodiments, the distance measuring device is disposed on a different element of the cleaning robot. It is crucial that, insofar as possible, this element is just above the surface to be cleaned, and projects beyond the housing of the cleaning robot in a direction parallel to the surface to be cleaned.

The under-run protection can make it possible to sense surface elements that project, above the surface to be cleaned, into the travel way of the cleaning robot. These surface elements are not concomitantly sensed by distance measuring devices close to the floor, or by distance measuring devices adapted primarily to sense the surface to be cleaned.

If the distance measuring device of the under-run protection senses a surface element with which the floor-cleaning robot would collide with, or crash into, the under-run protection can be configured to transmit a stop signal to the control unit, whereupon the control unit stops the floor-cleaning robot immediately. The under-run protection can thus constitute an emergency-stop mechanism, which can prevent collisions with objects projecting into the travel way of the floor-cleaning robot.

In some forms, the under-run protection device can sense the distance of a surface element that, as the floor-cleaning robot approaches, is disposed, at least temporarily, within a region of the first or second solid angle in which the distance in relation to the first or second measuring device is less than a minimum distance that can be determined by the first or second measuring device. If the first and the second measuring device for three-dimensional distance measurement are disposed at an elevated point on the floor-cleaning machine and face downwards on to the surface to be cleaned, it is then often the case that surface elements that project into the travel way of the cleaning robot do not appear in the first or second solid angle until shortly before a collision with the cleaning robot. Frequently, however, the first and the second measuring device for three-dimensional distance measurement are limited to a particular range in which they can sense a distance. In other words, they are only able to sense the distance if the latter is greater than a minimum distance. If the surface element projecting into the travel way of the cleaning robot projects into the first or second solid angle within the minimum distance, it can no longer be sensed by the first or second measuring device for three-dimensional distance measurement. In order to nevertheless prevent a collision, the under-run protection device can be disposed in such a manner that it senses these surface elements, and supplies the control unit with the distance of the surface element, with the result that the control unit can guide the cleaning robot around the surface element.

In yet another form, a floor-cleaning robot constructed in accordance with the teachings of the present disclosure can comprise one or more lateral distance measuring devices, which are can be disposed on the cover of the cleaning means, wherein each lateral distance measuring device can determine a distance of the cleaning means from a surface element, perpendicularly in relation to the direction of travel and parallelwise in relation to the surface to be cleaned. The control unit can be designed to generate and/or update the representation of the surface to be cleaned, on the basis of the distances sensed by means of the one or more lateral distance measuring devices.

The lateral distance measuring device is also an independent inventive concept, which can also be applied in conventional floor-cleaning machines that have a chassis and a cleaning means attached thereto. The lateral distance measuring device is disposed at the lowest possible point that projects beyond the housing of the floor-cleaning robot, in a plane parallel to the surface to be cleaned and perpendicular to the direction of travel. The lateral distance measuring device is advantageous, since it is thereby possible to travel particularly close to walls or other delimitations of the surface to be cleaned, with the result that thorough cleaning of the surface to be cleaned is possible, even in the corners and at the edges. Frequently, floor-cleaning machines known from the prior art can clean only up to a certain distance from walls and edges, with the result that uncleaned regions always remain.

Placement of the lateral distance measuring device on the cover of the cleaning device may initially appear to be disadvantageous, since the cleaning means is exposed to significantly greater vibration and shaking than, for example, the housing of the cleaning robot. However, this disadvantage is compensated for by the short distance at which the lateral distance measuring device is disposed above the surface to be cleaned. Because it is disposed close to the floor, it is possible to use a distance measuring device, for example an ultrasonic sensor or an infrared sensor, that has a particularly narrow opening cone, or that can sense a surface element in a particularly narrow solid angle. This opening cone is preferably aligned such that it impinges only outside of the greatest distance that can be sensed by the sensor, and more preferably does not impinge at all, upon the surface to be cleaned.

The lateral distance measuring device according to the teachings of the present disclosure can thus sense surface elements disposed only slightly above the floor to be cleaned, such as, for example, skirting boards on walls, with the result that the floor-cleaning robot can travel particularly close to walls. In this, it avoids the disadvantages of distance measuring devices that have a wide opening angle, or have an opening angle facing towards the floor. Frequently, such devices incorrectly sense even extremely flat elevations on the surface to be cleaned, or even depressions such as, for example, joints, which the floor-cleaning machine can actually travel over without difficulty, and which thus prevent complete cleaning of the entire surface to be cleaned. Since the lateral distance measuring device according to the invention preferably does not sense the surface to be cleaned, this problem, which occurs regularly in the prior art, is solved.

The cleaning robot can optionally have a gyroscope, wherein the gyroscope can sense a rotation of the floor-cleaning robot about an axis running perpendicularly in relation to the surface to be cleaned. This axis is also referred to as the vertical axis of the cleaning robot.

The chassis of a cleaning robot constructed in accordance with the teachings of the present disclosure can have an integrated encoder, by means of which the distance traveled can be determined. The control unit can be adapted to determine a position of the floor-cleaning robot in the representation of the surface to be cleaned, on the basis of the rotations sensed by means of the gyroscope and the distances determined by means of the encoder.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
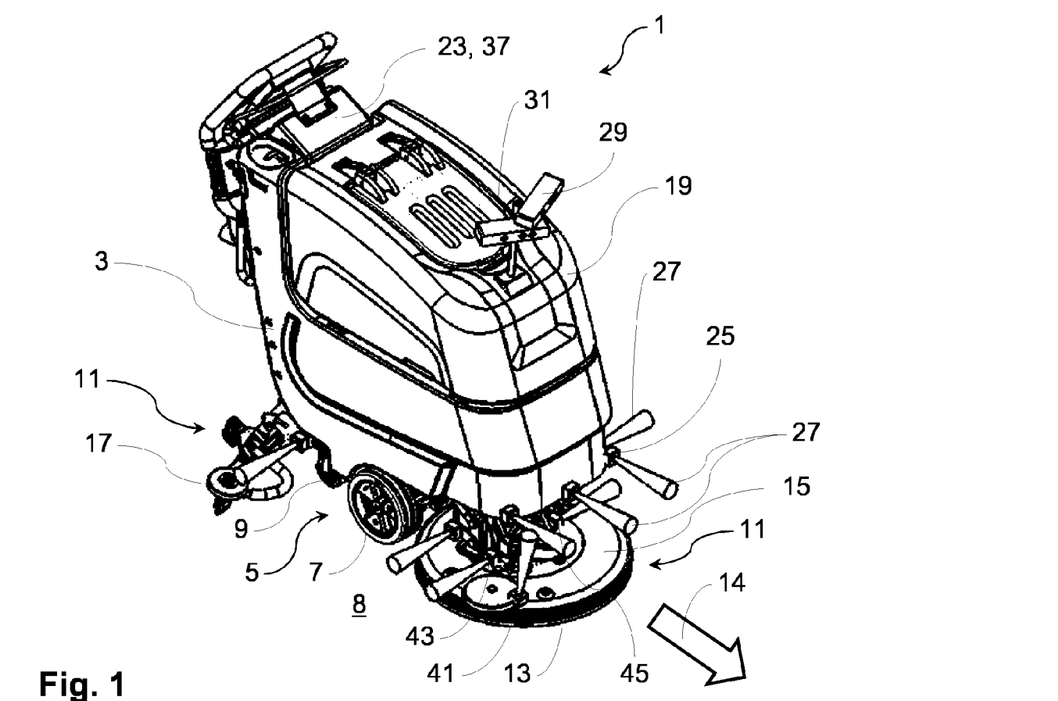
FIG. 1 is a perspective view of a floor-cleaning robot constructed in accordance with the teachings of the present disclosure.
Figure 2:
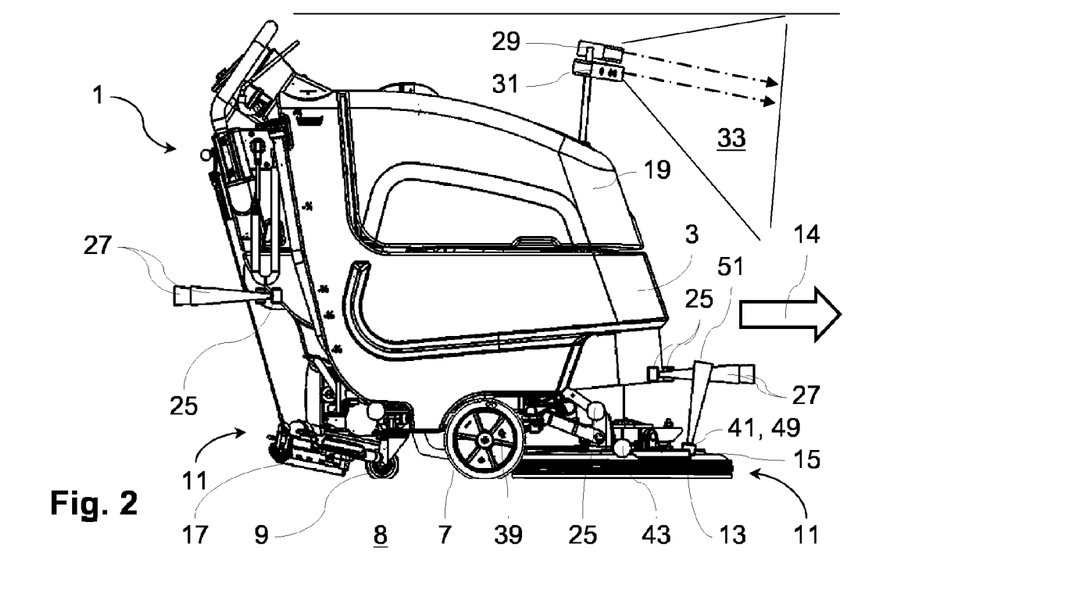
FIG. 2 is a side view of the floor-cleaning robot of FIG. 1.
Figure 3:
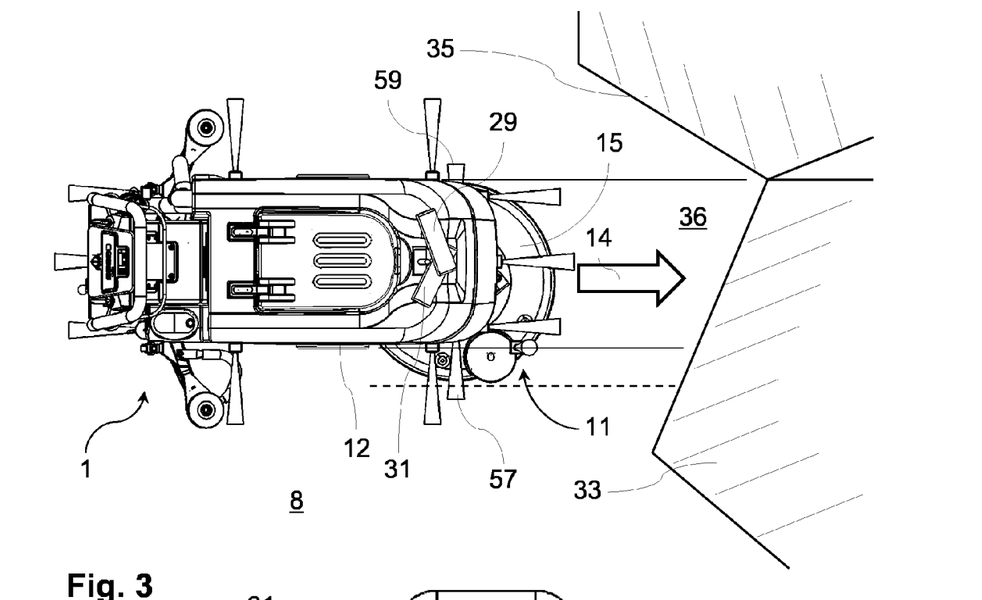
FIG. 3 is a plan view of the floor-cleaning robot of FIG. 1.
Figure 4:
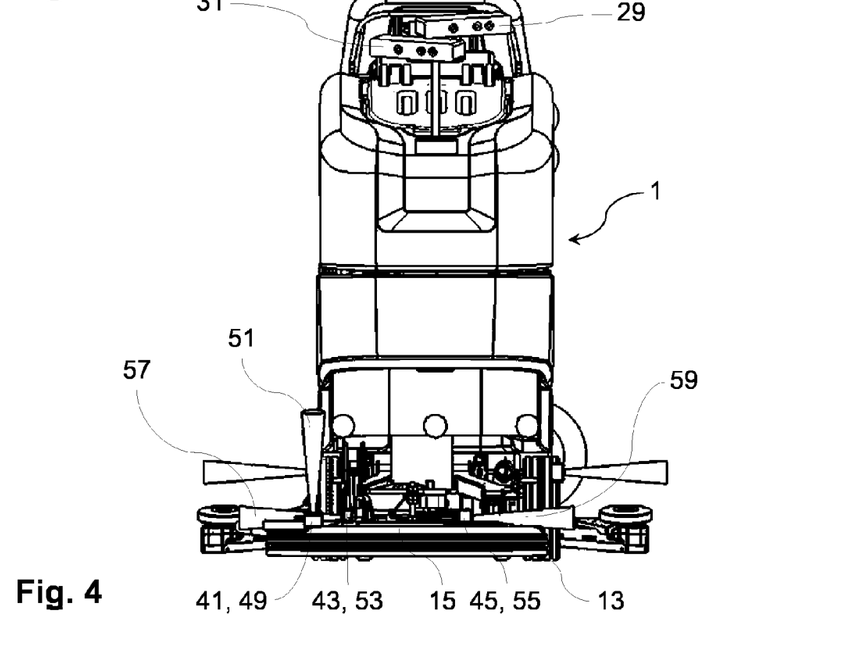
FIG. 4 is a front view of the floor-cleaning robot of FIG. 1.

An embodiment of a floor-cleaning robot, or cleaning robot, 1 constructed in accordance with the teachings of the present disclosure is represented in FIGS. 1 to 4. The cleaning robot 1 comprises a housing 3, which is disposed on a chassis 5. The chassis 5 has a drive, which is connected to the wheels 7. The wheels 7 can be driven, independently of each other, about an axis that runs parallelwise in relation to a surface 8 to be cleaned. In order to change the direction of movement of the cleaning robot 1, the wheels 7 can be driven at differing speeds or in differing directions of rotation. In addition, two further wheels 9 are mounted so as to be rotatable about a vertical axis. The vertical axis runs perpendicularly in relation to the surface 8 to be cleaned.

There is also a cleaning implement or cleaning means 11, disposed beneath the housing 3, which projects beyond the housing 3, towards a first side 12 and in the direction of travel 14. In this connection, the direction of travel 14 of the floor-cleaning robot 1 is understood to mean the direction which runs parallelwise in relation to the tangent of the movement path of the floor-cleaning robot 1 on the surface 8 to be cleaned, in the direction of forward travel of the robot.

The cleaning means 11 is formed as a brush head 13, 15, having a cleaning brush 13 that is rotationally driven, and a cover 15. The brush head 13, 15 and thus the cleaning means 11 are disposed in front of the chassis 5 and partially in front of the housing 3, in the direction of travel 14, and can be moved vertically relative to the housing 3, or the chassis 5, in order optionally to bring the brush head 13, 15 and thus the cleaning means 11 into engagement with the surface 8 to be cleaned. The cleaning means 11 additionally comprises a take-up device 17, in the form of a suction foot 17, by means of which dirt and dirty water can be taken up from the surface 8 to be cleaned. The liquid taken up by the take-up device 17 is collected in a dirty-water tank 19, which is pivotably mounted in the housing. Water, a cleaning fluid, or a mixture of water and a cleaning fluid can be applied via a water inlet disposed inside the brush head 13, 15, in order to improve the cleaning effect of the floor-cleaning robot 1.

The floor-cleaning robot 1 additionally comprises a control unit 23, represented schematically, which is adapted to guide the floor-cleaning robot 1 by means of a representation of the surface 8 to be cleaned. For this purpose, the control unit 23 can control the travel speed and the direction of travel 14 of the cleaning robot 1, as well as the use of the cleaning means 11. The control unit 23 can determine, for example, the speed at which and the direction in which the wheels 7 turn, and can thus change, if necessary, the direction of travel 14.

However, the floor-cleaning robot 1 can also be controlled by hand, by means of a handle 24 attached to the rear part of the housing 3, wherein control elements for the drive are provided in the region of the handle 24, with the result that the robot can also be operated like a conventional floor-cleaning machine.

A plurality of ultrasonic and infrared sensors 25 are disposed on the housing 3. Each of these sensors 25 can determine the distance in relation to a surface element located in the solid angle 27 that is sensed by the sensor 25. The distances in relation to surface elements that are sensed by the sensors 25 are transmitted to the control unit 23, which takes account of these distances in calculating the continuing travel way.

The floor-cleaning robot 1 additionally has a first and a second measuring device 29, 31 for three-dimensional distance measurement. The first measuring device 29 is adapted to simultaneously sense, or determine, the distance of the measuring device 29 from a plurality of surface elements, at a first solid angle 33. The second measuring device 31 is correspondingly adapted to sense the distance of the measuring device 31 from a plurality of surface elements, at a second solid angle 35.

In this connection, a three-dimensional distance measurement is understood to mean the measurement of the distance from a plurality of surface elements of a surface, wherein more than two surface elements, whose distance in relation to the measuring device can be measured, directly adjoin at least one surface element of the surface. Such a measuring device can therefore sense not only a linear arrangement of surface elements, but also a planar arrangement.

In this embodiment, each measuring device 29, 31 comprises a light source that, for example, emits light having a wavelength of approximately 830 nm. However, it is also quite conceivable to use a light source that emits light having different wavelengths in the infrared range. The light emitted by the light sources illuminates with a matrix, and in this case with a dot matrix, the surface elements disposed in the respective solid angle 33, 35. The matrix may be produced, for example, by a film. The use of a light source in the infrared wavelength range is advantageous, since the cleaning robot is not dependent upon adequate external illumination of the surface 8 to be cleaned but, at the same time, it does not emit light by which a person could be dazzled.

According to this embodiment, the measuring devices 29, 31 additionally comprise a camera, which can record light that was previously emitted by the respective light source and that is reflected by surface elements in the respective solid angle 33, 35. From the matrix reflected by the surface elements, an evaluation means, likewise provided in the measuring device 29, 31, calculates the distance of the measuring devices 29, 31 in relation to the surface elements. Such a measuring device 29, 31 is distributed, for example, under the name Kinect® by Microsoft®.

The light sources of the first measuring device 29 and the light source of the second measuring device 31 are preferably pulsed, and the light source of the first measuring device 29 is correlated with the light source of the second measuring device 31 in such a manner that the light source of the first measuring device 29 does not emit any light when the light source of the second measuring device 31 emits light. In this way, it can be ensured that, in each case, only one light source emits light at a time. This reliably prevents the matrices of the light sources from being superimposed on each other, and erroneous distance measurements from occurring.

The first and the second solid angle 33, 35 have the same extent perpendicularly in relation to the surface 8 to be cleaned. In other words, the measuring devices 29, 31, in the case of an identical vertical extent of the solid angles 33, 35, are inclined at the same angle in relation to the surface 8 to be cleaned. The solid angles 33, 35 are horizontally adjacent but, as can be seen from the plan view in FIG. 3, they do not overlap, and are therefore offset in relation to each other. In this way, advantageously, the matrices of the first and the second measuring device 29, 31 do not interfere with each other, i.e. the matrix produced by the first measuring device 29 is not sensed by the second measuring device 31, and vice versa. As can also be seen from FIG. 3, the first measuring device 29 is disposed in such a manner that the direction of travel 14 runs through the first solid angle 33. The measuring devices 29, 31 may also each comprise, for example, a further camera for recording radiation in the visible spectral range. The data of these cameras may be used, inter alia, to classify obstacles more accurately.

The first measuring device 29 is thus aligned in such a manner that it senses surface elements disposed in the travel path 36 of the floor-cleaning robot 1, as well as on a first side 12 of the floor-cleaning robot 1. The travel way or travel path 36 of the floor-cleaning robot 1 is to be understood here to mean the region of the surface 8 to be cleaned that is defined by the projection of the housing 3 onto the surface 8 to be cleaned when the robot 1 moves along its current direction of travel 14 in a straight line.

Moreover, the second measuring device 31 is aligned in such a manner that it senses only surface elements of the surface 8 to be cleaned that are disposed outside of the travel path 36 and on the side of the floor-cleaning robot 1 that faces away from the first side 12. In particular, the second measuring device 31 is aligned in such a manner that the second solid angle 35 is located on the side of the floor-cleaning robot 1 that faces away from the first side 12 and outside of which the travel path 36 is disposed, and the travel path 36 does not intersect the second solid angle 35.

The solid angles 33, 35 at which the first and the second measuring device 29, 31 sense the surface 8 to be cleaned are aligned perpendicularly in relation to the surface 8 to be cleaned, such that, in the travel way 36, sufficient obstacles over the entire height of the cleaning robot 1 are sensed in order to avoid collisions with such obstacles but, insofar as possible, no obstacles under which the cleaning robot 1 can pass through are sensed. Moreover, the measuring devices 29, 31 are aligned such that the surface 8 to be cleaned is sensed with the highest resolution at a distance of approximately one to three meters in the direction of travel 14 in front of the cleaning robot 1. The arrangement of the first and the second measuring device 29, 31 thus allows the environment of the floor-cleaning robot 1 to be sensed with a particularly large amount of detail. The second measuring device in this case serves, in particular, to sense the turning region of the cleaning robot 1. Owing to the arrangement of the cleaning means 11, the cleaning robot travels past primarily with the first side 12 close to walls or other objects, and therefore necessarily turns primarily in the direction of the side that is opposite the first side 12.

The control unit 23 is designed to guide the cleaning robot 1 over the surface 8 to be cleaned, by means of a representation of the latter, and to clean the surface 8. The surface 8 may be represented, for example, in the form of a map. This map may be made available to the cleaning robot 1 before the cleaning operation. In this case, the cleaning robot 1 uses the distances in relation to surface elements, sensed by the measuring devices 29, 31 for three-dimensional distance measurement and by the sensors 25, to update continuously the representation of the surface 8, in order to adapt the latter to changes to the surface. Alternatively, the representation of the surface 8 may also be produced or generated automatically by the control unit 23 from the distances and positions in the space that have been sensed by the measuring devices 29, 31. In each case, the map may be stored, in any file format, in a memory of the control unit 23.

The control unit 23 comprises a gyroscope 37, by means of which rotations of the cleaning robot 1 about the vertical axis can be measured. In addition, the wheels 7 comprise an encoder 39, which measures the number of revolutions of the wheels 7, and thus the distance traveled by the cleaning robot 1. The control unit 23 is adapted to determine a position and orientation of the floor-cleaning robot 1 in the representation of the surface 8 to be cleaned, from the data recorded by means of the gyroscope 37 and the encoder 39, together with the distances sensed by means of the measuring devices 29, 31.

The floor-cleaning robot 1 additionally has an under-run protection device 41 and two lateral distance measuring devices 43, 45. The under-run protection device 41 and the lateral distance measuring device 43, 45 constitute independent inventive concepts. Neither concept is limited to application in floor-cleaning robots, but may be employed generally in floor-cleaning machines that have a chassis, possibly having a drive, and a cleaning means attached to the chassis.

In addition, an under-run protection device 41 is disposed on the cover 15 of the cleaning means 11, which is designed as a brush head 13, 15. This under-run protection device comprises a distance measuring device, in the form of an ultrasonic sensor 49, which is aligned substantially perpendicularly in relation to the surface 8 to be cleaned. The alignment of the ultrasonic sensor 49 in this case relates to the direction in which the ultrasonic sensor 49 emits an ultrasonic field 51. The ultrasonic sensor 49 is disposed at a point on the floor-cleaning machine that is located parallel to the direction of travel 14 of the floor-cleaning robot 1, in front of the housing 3.

The ultrasonic sensor 49 senses surface elements located in the travel way 36 of the cleaning robot 1. The under-run protection device 41 may be connected to the control means 23, which incorporates the distance of a surface element, sensed by the ultrasonic sensor 49, into the representation of the surface 8 to be cleaned, and takes account of this distance in guiding the floor-cleaning robot 1.

The under-run protection 41 is an independent inventive concept, which may also be used on other floor-cleaning robots or floor-cleaning machines that, for example, do not have a cover 15 of the brush head 13, 15 projecting beyond the housing 3. In this case, the under-run protection 41 is disposed on an element of the floor-cleaning robot that is as close as possible to the surface 8 to be cleaned and projects beyond the housing 3 in a plane parallel to the surface 8 to be cleaned.

In addition, on the cover 15 of the brush head 13, 15, the floor-cleaning robot 1 has two lateral distance measuring devices 43, 45. Each lateral distance measuring device 43, 45 comprises a device, in the form of an ultrasonic sensor 53, 55, for determining a distance from a surface element. The ultrasonic sensors 53, 55 are aligned in such a manner that the ultrasonic field emitted by them in an opening cone 57, 59 is emitted substantially parallelwise in relation to the surface 8 to be cleaned and perpendicularly in relation to the direction of travel 14. The ultrasonic sensors 53, 55 can thus determine the distance of the floor-cleaning robot 1 in relation to a surface such as, for example, a wall or shelves, running parallelwise in relation to the direction of travel 14. Since the ultrasonic sensors 53, 55 are disposed on the cover 15 of the brush head 13, 15, they are located only a few centimeters above the surface 8 to be cleaned and, particularly advantageously, are suitable for guiding the floor-cleaning robot 1 particularly close to walls and, for example, skirting boards, and for ensuring a thorough and complete cleaning of the surface 8.

Because it is disposed close to the floor, it is possible to use a distance measuring device 53, 55 that has a particularly narrow opening cone 59, or that can sense a surface element in a particularly narrow solid angle. These opening cones 57, 59 are aligned such that they impinge only outside of the greatest distance that can be sensed by the sensor, and more preferably do not impinge at all, upon the surface 8 to be cleaned. The lateral distance measuring device 43, 45 according to the invention can thus sense surface elements disposed only slightly above the surface 8 to be cleaned, such as, for example, skirting boards on walls, with the result that the floor-cleaning robot 1 can travel particularly close to walls. In this, it avoids the disadvantages of distance measuring devices that have a wide opening angle, or have an opening angle facing towards the floor. Frequently, such devices incorrectly sense even extremely flat elevations on the surface 8 to be cleaned, or even depressions such as, for example, joints, which the floor-cleaning machine can actually travel over without difficulty, and which thus prevent complete cleaning of the entire surface 8 to be cleaned.

The lateral distance measuring devices 43, 45 are also an independent inventive concept, which can also be used on other floor-cleaning robots or floor-cleaning machines. The lateral distance measurement is characterized by the fact that the lateral distance measuring devices 43, 45 are disposed directly on the brush head 13, 15, which projects beyond the floor-cleaning machine, or cleaning robot 1, itself, mostly perpendicularly in relation to the direction of travel 14, and which is disposed as close as possible to the floor. The devices 43, 45 on the brush head 13, 15 are undoubtedly exposed to greater vibration than would be the case if they were disposed on the housing 3 of a floor-cleaning machine. In total, however, the advantages of disposing the devices 43, 45 close to the floor prevail.

The floor-cleaning robot 1 has been described with reference to a floor-cleaning machine that, as an alternative to autonomous travel, can also be operated by a person walking behind the floor-cleaning machine. However, the invention is not limited to such floor-cleaning machines. It may also easily be extended to floor-cleaning machines on which the operator sits or stands, or with which the operator travels, i.e., in particular, ride-on machines.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A floor-cleaning robot comprising:
   a housing;
   a chassis with a drive for moving the floor-cleaning robot in a direction of travel over a surface to be cleaned,
   a cleaning implement that is adapted to engage with the surface to be cleaned,
   a first three-dimensional distance measuring device that is configured to measure distance within a first volume that is defined in part by a first solid angle, the first solid angle spanning from the first three-dimensional distance measuring device, the first three-dimensional distance measuring device being adapted to sense distances between the first three-dimensional distance measuring device and each of a plurality of first surface elements within the first solid angle, a second three-dimensional distance measuring device that is configured to measure distance within a second volume that is defined in part by a second solid angle, the second solid angle spanning from the second three-dimensional distance measuring device, the second three-dimensional distance measuring device being adapted to sense distances between the second three-dimensional distance measuring device and each of a plurality of second surface elements within the second solid angle, and a controller that is configured to at least one of generate and update a representation of the surface to be cleaned based on the distances from the first and second surface elements sensed by the first and second three-dimensional distance measuring devices, respectively, the controller guiding the floor-cleaning robot over the surface to be cleaned based at least partly on the representation of the surface to be cleaned, wherein the first three-dimensional distance measuring device and the second three-dimensional distance measuring device are aligned in such a manner that the direction of travel runs through the first solid angle, and the second solid angle is offset in relation to the first solid angle, and wherein the first and second solid angles are horizontally adjacent to one another.

2. The robot according to claim 1, wherein the cleaning implement projects towards a first side of the floor-cleaning robot, perpendicularly in relation to the direction of travel and parallelwise in relation to the surface to be cleaned, and wherein the second measuring device is aligned in such a manner that the second solid angle is located on a second side of the floor-cleaning robot that faces away from the first side, the second solid angle further being disposed outside of the travel path of the floor cleaning robot such that the travel path does not intersect the second solid angle.

3. The floor-cleaning robot according to claim 1, wherein each of the first and the second three-dimensional distance measuring devices comprises a light source, a camera and a controller, each of the light sources emitting light having a wavelength in a range of between 780 nm and 3000 nm, and illuminating, with a matrix, surface elements that are disposed within a respective one of the first and second solid angles, each of the cameras sensing light that has been emitted by a respective one of the light sources and reflected by associated ones of the surface elements toward the camera within the respective one of the first and second solid angles and responsively generating a camera signal, and each of the controllers is configured to determine, from the matrix reflected by the surface elements and the camera signal of an associated one of the cameras, the distances between the respective one of the first and second three-dimensional distance measuring devices and associated ones of the surface elements.

4. The floor-cleaning robot according to claim 3, wherein the light source of the first three-dimensional distance measuring device and the light source of the second three-dimensional distance measuring device are pulsed, and the light source of the first three-dimensional distance measuring device is correlated with the light source of the second three-dimensional distance measuring device in such a manner that the light source of the first three-dimensional distance measuring device does not emit any light when the light source of the second three-dimensional distance measuring device emits light.

5. The floor-cleaning robot according to claim 1, wherein the first and the second solid angles do not overlap.

6. The floor-cleaning robot according to claim 1, wherein the cleaning implement is disposed at least partially in the direction of travel in front of the housing, and the cleaning implement has a cover that projects beyond the housing, parallelwise in relation to a surface to be cleaned, and at least one of a) in the direction of travel and b) perpendicularly in relation to the direction of travel.

7. The floor-cleaning robot according to claim 6, wherein the cleaning implement comprises one or more rotating cleaning brushes disposed beneath the cover.

8. The floor-cleaning robot according to claim 6, wherein an under-run protection device is disposed on the cover, wherein the under-run protection device comprises a distance measuring device that senses a distance between the under-run protection device and one of the surface elements that is located in the direction of travel in front of the housing of the floor-cleaning robot, and the under-run protection device is configured to transmit a stop signal to the controller.

9. The floor-cleaning robot according to claim 8, wherein the measurement region of the distance measuring device is aligned substantially perpendicularly to the surface to be cleaned.

10. The floor-cleaning robot according to claim 8, wherein the distance measuring device of the under-run protection device comprises at least one of an ultrasonic sensor and an infrared sensor.

11. The floor-cleaning robot according to claim 8, wherein the distance measuring device of the under-run protection device is configured to sense a presence of an object that is located in front of the floor-cleaning robot and in the path of travel that is too close to the floor-cleaning robot to be sensed by either of the first and second measuring devices.

12. The floor-cleaning robot according to claim 6, wherein the floor-cleaning robot comprises one or more lateral distance measuring devices that are disposed on the cover, and wherein each lateral distance measuring device is configured to sense a distance between the cleaning implement and an associated one of the surface elements in a direction that is perpendicular to the direction of travel and parallel to the surface to be cleaned.

13. The floor-cleaning robot according to claim 1, wherein the floor-cleaning robot comprises a gyroscope that is configured to sense rotation of the floor-cleaning robot about an axis that is orthogonal to the surface to be cleaned and the path of travel.

14. The floor-cleaning robot according to claim 1, wherein the chassis comprises an encoder that senses a distance traveled by the floor-cleaning robot and responsively produces an encoder signal.

15. The floor-cleaning robot according to claim 14, wherein the floor-cleaning robot comprises a gyroscope that is configured to sense rotation of the floor-cleaning robot about an axis that is orthogonal to the surface to be cleaned and the path of travel and to responsively generate a gyroscope signal, and wherein the controller is configured to determine a position of the floor-cleaning robot in the representation of the surface to be cleaned, the position being determined on the basis of the gyroscope signal and the encoder signal.

* * * * *